United States Patent
Qi

(10) Patent No.: US 12,010,225 B2
(45) Date of Patent: Jun. 11, 2024

(54) DISCRETE VARIABLE QUANTUM KEY DISTRIBUTION USING CONJUGATE HOMODYNE DETECTION

(71) Applicant: UT-Battelle, LLC, Oak Ridge, TN (US)

(72) Inventor: Bing Qi, Knoxville, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 161 days.

(21) Appl. No.: 17/699,904

(22) Filed: Mar. 21, 2022

(65) Prior Publication Data

US 2022/0303130 A1  Sep. 22, 2022

Related U.S. Application Data

(60) Provisional application No. 63/163,972, filed on Mar. 22, 2021.

(51) Int. Cl.
*H04L 9/08* (2006.01)

(52) U.S. Cl.
CPC .................. *H04L 9/0858* (2013.01)

(58) Field of Classification Search
CPC .............................. H04L 9/0858; H04L 9/085
See application file for complete search history.

(56) References Cited

U.S. PATENT DOCUMENTS

| | | | |
|---|---|---|---|
| 9,768,885 B2 | 9/2017 | Qi | |
| 10,585,645 B2 | 3/2020 | Qi | |
| 10,635,403 B1 | 4/2020 | Pooser et al. | |
| 10,944,553 B2 * | 3/2021 | Qi | H04B 10/70 |
| 2004/0109564 A1 * | 6/2004 | Cerf | H04L 9/0858 |
| | | | 380/256 |
| 2009/0268901 A1 * | 10/2009 | Lodewyck | H04L 9/0852 |
| | | | 380/279 |
| 2020/0162248 A1 | 5/2020 | Qi et al. | |
| 2021/0036846 A1 | 2/2021 | Grice et al. | |

(Continued)

OTHER PUBLICATIONS

Gisin, N. et al., "Quantum cryptography", Rev. Mod. Phys., 2002, pp. 145-195, vol. 74, No. 1.

(Continued)

*Primary Examiner* — Abiy Getachew
(74) *Attorney, Agent, or Firm* — Scully, Scott, Murphy & Presser, P.C.

(57) ABSTRACT

A system and a receiver for generating quantum key(s) using conjugated homodyne detection is provided. The receiver may communicate with a transmitter via an insecure quantum channel and a classical channel to generate the quantum key(s). A decoder, in the receiver, may determine, based at least in part on quadratures X, P measured by conjugated homodyne detectors, a raw-key signal corresponding to a key signal generated by the transmitter, and a distribution of photon numbers corresponding to a quantum signal received via the insecure quantum channel. Information about the key signal is exchanged between the receiver and the transmitter via the classical channel and used to determine a quantum bit error rate of the determined raw-key signal. A gain is also obtained. A secure-key rate is calculated based at least in part on the gain, the quantum bit error rate, and the photon number distribution.

26 Claims, 9 Drawing Sheets

(56) References Cited

U.S. PATENT DOCUMENTS

2023/0142045 A1* 5/2023 Bucklew .............. H04L 9/0858 380/255

OTHER PUBLICATIONS

Scarani, V. et al., "The security of practical quantum key distribution", Rev. Mod. Phys., 2009, pp. 1301-1350, vol. 81, No. 3.

Lo, H. et al., "Secure quantum key distribution", Nat. Photon., 2014, pp. 595-604, vol. 8.

Diamanti, E. et al., "Practical challenges in quantum key distribution", npj Quantum Inf., 2016, pp. 1-12, vol. 2.

Xu, F. et al., "Secure quantum key distribution with realistic devices", Rev. Mod. Phys., 2020, pp. 025002-1 to 025002-60, vol. 92.

Pirandola, S. et al., "Advances in quantum cryptography", Adv. Opt. Photon., 2020, pp. 1-118, vol. 12, arXiv: 1906.01645.

Hillery, M., "Quantum cryptography with squeezed states", Phys. Rev. A, 2000, pp. 022309-1 to 022309-8, vol. 61.

Grosshans, F. et al., "Quantum key distribution using gaussian-modulated coherent states", Nature, 2003, pp. 238-241, vol. 421.

Qi, B. et al., "Feasibility of Quantum Key Distribution through Dense Wavelength Division Multiplexing Network", New J. Phys., 2010, pp. 1-17, vol. 12.

Kumar, R. et al., "Coexistence of Continuous Variable QKD with Intense DWDM Classical Channels", New J. Phys., 2015, pp. 1-12, vol. 17.

Qi, B. et al., "Generating the Local Oscillator 'Locally' in Continuous-Variable Quantum Key Distribution Based on Coherent Detection", Phys. Rev. X, 2015, pp. 041009-1 to 041009-12, vol. 5.

Soh, D. et al., "Self-Referenced Continuous-Variable Quantum Key Distribution Protocol", Phys. Rev. X, 2015, pp. 041010-1 to 041010-15, vol. 5.

Grice, W. et al., "Homodyne Detection in a Photon Counting Application", J. Mod. Opt., 1996, pp. 795-805, vol. 43, No. 4.

Qi, B. et al., "Characterizing photon number statistics using conjugate optical homodyne detection", Opt. Express, 2020, pp. 2276-2290, vol. 28, No. 2.

Shor, P. et al., "Simple Proof of Security of the BB84 Quantum Key Distribution Protocol", Phys. Rev. Lett, 2000, pp. 441-444, vol. 85, No. 2.

Hwang, W., "Quantum Key Distribution with High Loss: Toward Global Secure Communication", Phys. Rev. Lett., 2003, pp. 057901-1 to 057901-4, vol. 91, No. 5.

Wang, X., "Beating the Photon-number-splitting Attack in Practical Quantum Cryptography", Phys. Rev. Lett., 2005, pp. 230503-1 to 230503-4, vol. 94.

Lo, H. et al., "Measurement-Device Independent Quantum Key Distribution", Phys. Rev. Lett, 2012, pp. 130503-1 to 130503-5, vol. 108.

Qi, B. et al., "Time-shift attack in practical quantum cryptosystems", Quantum Info. Comput., 2007, pp. 1-10, vol. 7.

Fung, C. et al., "Practical issue in quantum-key-distribution post-processing", arXiv:0910.0312v2 [quantum-ph], Dec. 2009, pp. 1-17.

* cited by examiner

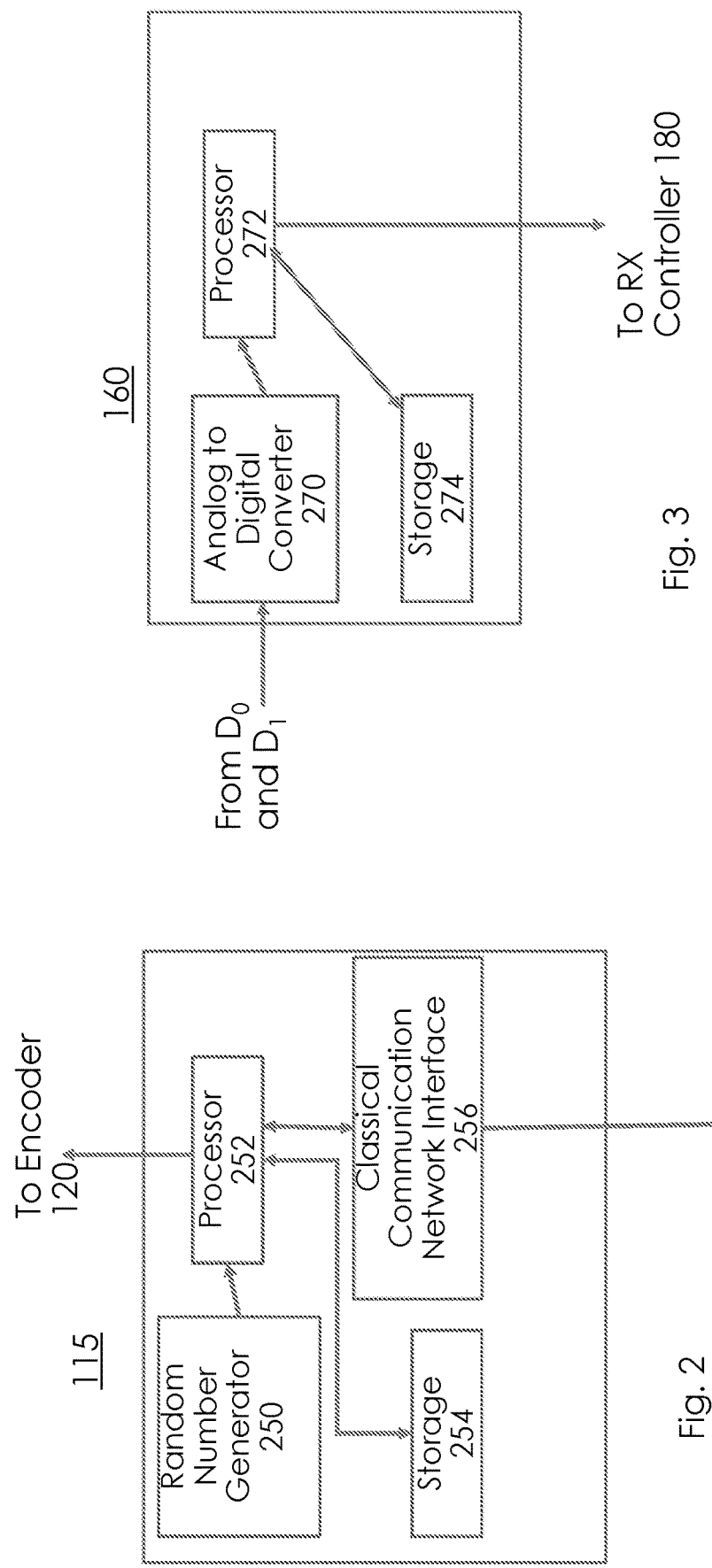

DISCRETE VARIABLE QUANTUM KEY DISTRIBUTION USING CONJUGATE HOMODYNE DETECTION

CROSS-REFERENCE TO RELATED APPLICATIONS

This application claims the benefit of and priority to U.S. Provisional Application Ser. No. 63/163,972 filed on Mar. 22, 2021, the entirety of which are incorporated by reference.

STATEMENT REGARDING FEDERALLY SPONSORED RESEARCH

The United States Government has rights in this invention pursuant to contract no. DE-AC05-00OR22725 between the United States Department of Energy and UT-Battelle, LLC.

FIELD OF THE DISCLOSURE

This disclosure relates to quantum communication. More specifically, the disclosure relates to quantum key distribution.

BACKGROUND

Quantum keys allow two parties (such as Alice and Bob) to securely communication using a shared random secure (secret) key, e.g., the quantum key. The quantum key may be used to encrypt and decrypt messages. A quantum key is generated via the quantum key distribution (QKD). QKD can revolutionize cryptography.

There are several known methods for QKD. For example, one QKD protocol is a discrete-variable (DV) QKD and uses a single-photon detection. Single-photon avalanche diodes are commonly used in the DV-QKD. This type of single-photon detector (SPD) can discriminate a vacuum state from a non-vacuum state but cannot resolve photon numbers. The SPD operates at relatively low temperatures, which makes a practical operation of this detector difficult and expensive to maintain the relatively low temperatures. The SPD also has a limited communication rate due to deadtime. Additionally, there are no intrinsic filters in the SPD.

One example of DV-QKD is the BB84 QKD protocol. BB84 QKD has been used over relatively long distances and has certain security proofs, especially when system imperfections and finite data size are taken into account. Additionally, SPD do not require a phase reference and have extremely low noise.

Another known QKD protocol is continuous-variable (CV) QKD which uses coherent detection (optical homodyne detection). Optical homodyne detection (detectors) comprise low-cost photodiodes and can be operated in room-temperature. These detectors also can be operated at high-speeds such as above tens of GHz with negligible deadtime. These detectors require a local oscillator which provides intrinsic filtering and can effectively suppress background photons. Optical homodyne detection may allow for the quantum keys to be distributed through conventional dense wavelength-division-multiplexed fiber networks in the presence of strong classic traffic and through free-space channels. CV-QKD may be implemented with conventional telecommunication components and may enable potentially high key rates at short distances.

A conjugate homodyne detection system, which consists of a beam splitter followed by two optical homodyne detectors, can simultaneously measure a pair of conjugate quadratures X and P of the incoming quantum state by maintaining a 90° phase offset between the two corresponding local oscillators. In classical electrodynamics, $X^2+P^2$ is proportional to the energy (the photon number) of the input light. In quantum optics, X and P do not commute and thus cannot be determined simultaneously and noiselessly due to Heisenberg's uncertainty principle. This suggests that the above conjugate homodyne detection is intrinsically noisy. Intuitively, noisy detectors would result poor QKD performance if standard security proofs are applied.

SUMMARY

Accordingly, disclosed is a system comprising a transmitter (TX) device and a receiver (RX) device.

The TX device may comprise a photon source, an TX controller and an encoder. The photon source may be configured to emit a sequence of photons having a source rate. The TX controller may be configured generate a key signal having a bit rate equal to the source rate. The encoder may be configured to encode, based on a discrete-variable encoding protocol, the key signal on the sequence of photons to form a quantum signal, and launch the quantum signal on an insecure quantum channel with a transmission rate equal to the source rate.

The RX device may comprise a modulator, a first polarization-beam splitter (PBS), first and second conjugate homodyne detectors, a decoder and a RX controller. The modulator may be communicatively coupled with the encoder through the insecure quantum channel. The modulator may be configured to receive the quantum signal, and randomly modulate the received quantum signal to obtain a modulated quantum signal having the transmission rate. The PBS may be configured to project the modulated quantum signal in either a first polarization or a second polarization orthogonal to the first polarization. The first conjugate homodyne detector may be configured to receive the modulated quantum signal projected in the first polarization, and simultaneously measure conjugate quadratures X, P of the modulated quantum signal projected in the first polarization. The second conjugate homodyne detector may be configured to receive the modulated quantum signal projected in the second polarization, and simultaneously measure conjugate quadratures X, P of the modulated quantum signal projected in the second polarization. The decoder may be configured to determine, based at least in part on the measured quadratures X, P, a raw-key signal corresponding to the key signal, and a distribution of photon numbers corresponding to the received quantum signal. The RX controller may be configured to exchange, with the TX controller over a classical communication channel, information about the key signal, obtain a gain Q based on the determined raw-key signal and obtain a quantum bit error rate E based on the determined raw-key signal and the exchanged information, and calculate a secure-key rate R based at least in part on the obtained gain Q and quantum bit error rate E, and the determined photon number distribution.

In an aspect of the disclosure, the RX device may further comprise a laser and a second PBS. The laser may be configured to emit light as local oscillators for the homodyne detectors. The second PBS may be configured to redirect a first portion of the local oscillator in the first polarization to the first conjugate homodyne detector, and a second portion of the local oscillator in the second polarization to the second conjugate homodyne detector. In an aspect of the disclosure, the laser may have a pulse repetition rate that matches the source rate.

In an aspect of the disclosure, the decoder may be configured to determine the raw-key signal using a detection mode selected from a plurality of detection modes. The detection modes may be an independent detection mode or a differential detection mode. When the independent detection mode is used, the secure-key rate R may be calculated further using a predetermined detection threshold $\tau$. In some aspects, the predetermined detection threshold r may be in the range of 1 to 10.

In an aspect of the disclosure, when using the independent detection mode, the decoder may be configured to determine the raw-key signal using outputs of the first conjugate homodyne detector and the second conjugate homodyne detector independently by comparing the outputs with the predetermined detection threshold r associated with the first and second conjugate homodyne detectors. Further, when using the independent detection mode, the RX controller may be configured to calculate the secure-key rate R based further on the predetermined detection threshold $\tau$.

In an aspect of the disclosure, when using the differential detection mode, the decoder may be configured to determine the raw-key signal using outputs of the first conjugate homodyne detector and the second conjugate homodyne detector jointly by comparing the outputs with each other.

In an aspect of the disclosure, the insecure quantum channel may comprise an optical fiber. The optical fiber may have a length of less than about 20 km. In other aspects, the optical fiber length may be less than about 10 km. In other aspects, the optical fiber may be less than 1 km. In other aspects, the insecure quantum channel may be a free-space channel.

In an aspect of the disclosure, the conjugate homodyne detectors may comprise shot-noise limited balanced photodiodes with a bandwidth of 5 GHz. The photodiodes may be configured to be operated at room temperature.

In an aspect of the disclosure, the transmission rate may be in the range of 1 MHz to 10 GHz.

In an aspect of the disclosure, a secure key K may be produced by exchanging information between the TX controller and the RX controller. In an aspect of the disclosure, multiple secure keys may be generated. In an aspect of the disclosure, the secure keys may be used for a preset time or number of communications.

In an aspect of the disclosure, the discrete-variable encoding protocol may be a polarization encoding protocol. The protocol may use BB84.

Also disclosed is a receiver which may comprise a modulator, a first polarization-beam splitter (PBS), first and second conjugate homodyne detectors, a decoder and a RX controller. The modulator may be communicatively coupled with a transmitter (TX) through an insecure quantum channel. The modulator may be configured to receive a quantum signal formed by the TX as a sequence of photons encoded, based on a discrete-variable encoding protocol, with a key signal, and randomly modulate the received signal to obtain a modulated quantum signal. The first PBS may be configured to project the modulated quantum signal in either a first polarization or a second polarization orthogonal to the first polarization. The first conjugate homodyne detector may be configured to receive the modulated quantum signal projected in the first polarization, and simultaneously measure conjugate quadratures X, P of the modulated quantum signal projected in the first polarization. The second conjugate homodyne detector may be configured to receive the modulated quantum signal projected in the second polarization, and simultaneously measure conjugate quadratures X, P of the modulated quantum signal projected in the second polarization. The decoder may be configured to determine, based at least in part on the measured quadratures X, P, a raw-key signal corresponding to the key signal, and a distribution of photon numbers corresponding to the received quantum signal. The RX controller may be configured to exchange, with the TX over a classical communication channel, information about the key signal, obtain a gain Q based on the determined raw-key signal and obtain a quantum bit error rate E based on the determined raw-key signal and the exchanged information, and calculate a secure-key rate R based at least in part on the obtained gain Q and quantum bit error rate E, and the determined photon number distribution.

In an aspect of the disclosure, the receiver may further comprise a laser and a second PBS. The laser may be configured to emit light as local oscillators for the homodyne detectors. The second PBS may be configured to redirect a first portion of the local oscillator in the first polarization to the first conjugate homodyne detector, and a second portion of the local oscillator in the second polarization to the second conjugate homodyne detector. In an aspect of the disclosure, the laser may have a pulse repetition rate that matches the source rate.

In an aspect of the disclosure, the decoder may be configured to determine the raw-key signal using a detection mode selected from a plurality of detection modes. The detection modes may be an independent detection mode or a differential detection mode. When the independent detection mode is used, the secure-key rate R may be calculated further using a predetermined detection threshold $\tau$.

In an aspect of the disclosure, when using the independent detection mode, the decoder may be configured to determine the raw-key signal using outputs of the first conjugate homodyne detector and the second conjugate homodyne detector independently by comparing the outputs with the predetermined detection threshold r associated with the first and second conjugate homodyne detectors. Further, when using the independent detection mode, the RX controller may be configured to calculate the secure-key rate R based further on the predetermined detection threshold $\tau$.

In an aspect of the disclosure, when using the differential detection mode, the decoder may be configured to determine the raw-key signal using outputs of the first conjugate homodyne detector and the second conjugate homodyne detector jointly by comparing the outputs with each other.

In an aspect of the disclosure, the conjugate homodyne detectors in the receiver may comprise shot-noise limited balanced photodiodes with a bandwidth of 5 GHz. The photodiodes may be configured to be operated at room temperature.

In an aspect of the disclosure, the detection mode may be set based on the receiver, the transmitter, a user, network traffic, priority and/or a target strength for the secure key.

BRIEF DESCRIPTION OF THE DRAWINGS

FIG. 2 illustrates a diagram of a TX controller in accordance with aspects of the disclosure;

FIG. 3 illustrates a diagram of a decoder in accordance with aspects of the disclosure;

DETAILED DESCRIPTION

In accordance with aspects of the disclosure, a quantum key (also referred to as a secure key or secret key) may be distributed between two or more parties based on a DV-QKD using conjugated homodyne detections. For purposes of the description a transmitter (TX) device 102 may also be referred to as "Alice" and the receiver (RX) device 106 may also be referred to as "Bob".

Figure 1:
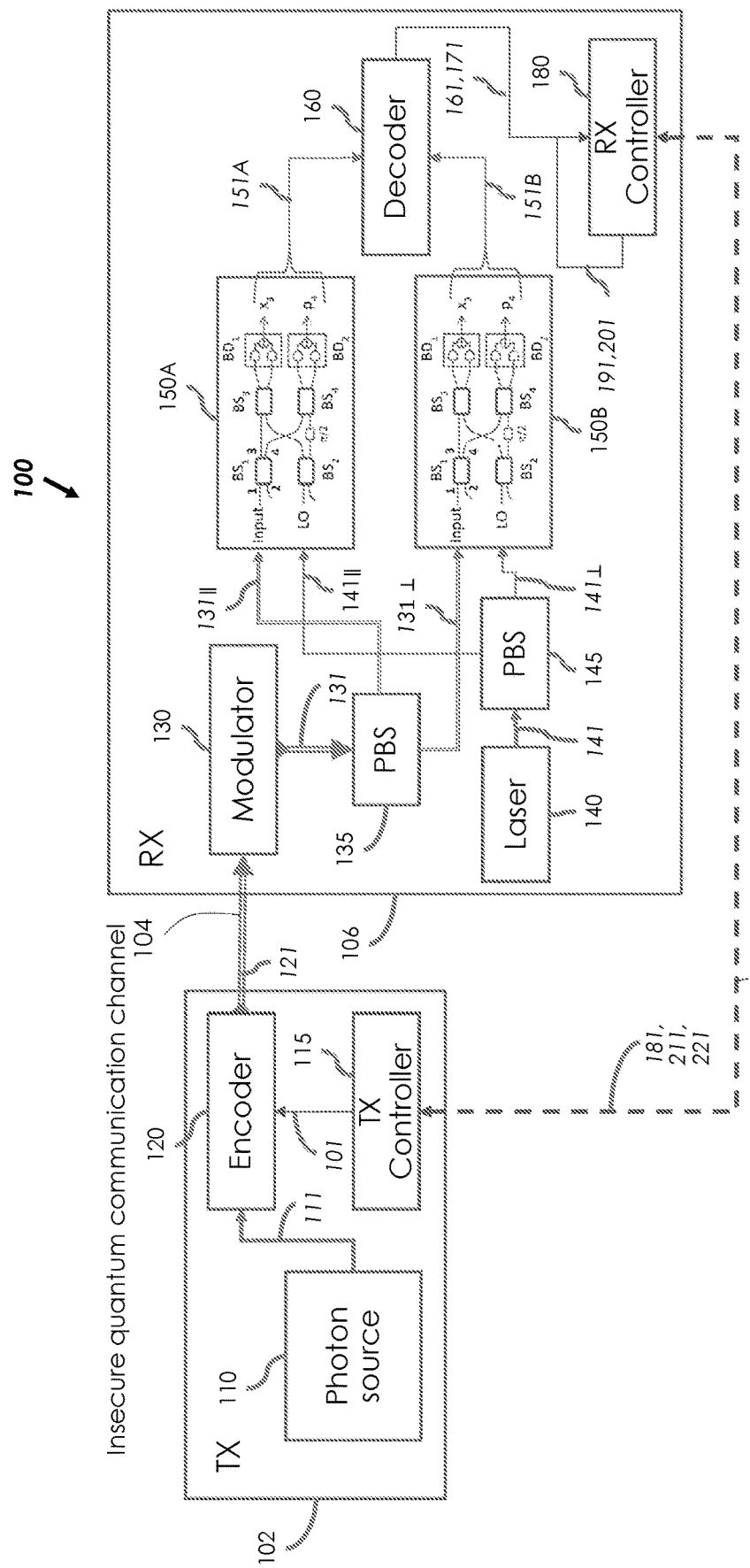
FIG. 1 illustrates a diagram of a quantum key distribution system in accordance with aspects of the disclosure.

FIG. 1 illustrates an example of a system 100 for distributing a quantum key in accordance with aspects of the disclosure. The system 100 may comprise a TX device 102 and a RX device 106. The same TX device 102 and RX device 106 is able to communicate using an insecure quantum communication channel 104 (also referred to as quantum channel) and a classical communication channel 108 (also referred to as a classical channel). The quantum channel 104 and classical channel 108 may be in the same or a different medium. For example, the quantum channel 104 may be in free-space link or in a fiber optic cable. The classical channel 108 may also be in free-space or in a fiber optic cable. In some implementations, the classical communication channel 108 can include one or more of a Cu-wire connection, an optical fiber connection, or a wireless connection, and communications can be carried out using a TCP/IP communication protocol. In some aspects, when a fiber optic cable is used, the length may be in a range of 1-10 km. In some aspects, the length may be less than 20 km. In some aspects, the length may be less than 1 km. In some aspects, the length may be less than 50 km.

Both channels may be considered wired or wireless.

The TX device 102 may comprise a photon source 110, an TX controller 115 and an encoder 120. The photon source 110 may be configured to emit a sequence 111 of photons having a source rate $f_s$ in a range of 1 MHz to 10 GHz. Each emission of the photon source includes a weak light pulse of a particular central wavelength $\lambda$, with an average photon number in the order of 1, and a total of N emissions having a periodicity of $$\frac{1}{f_s},$$

with a typical range or $10^4 \leq N \leq 10^6$. In some aspects of the disclosure, the photon source 110 may comprise a laser generating pulses with an attenuator. The attenuator attenuates the pulses from the laser to reduce the average photon number. In some aspects of the disclosure, the photon source 110 can be a single-photon source configured to emit, on a one photon at-a-time basis, N photons with the periodicity $$\frac{1}{f_s}.$$

The encoder 120 may be positioned between the photon source 110 and the quantum channel 104. The encoder 120 may be configured to rotate the polarization of the sequence 111 to a final polarization for transmission on the quantum channel 104 based on a key signal 101 and an encoding basis. The encoder 120 may comprise variable waveplates. Another example is waveguide-based phase modulator.

FIG. 2 illustrates a diagram of the TX controller 115. The TX controller 115 may comprise a random number generator 250, a processor 252, a storage 254 and a classical communication network interface 256. In some aspects, the random number generator 250 may be a quantum random number generator. The random number generator 250 may be configured to generate the bits for basis selection and the key signal 101.

The storage 254 may be any storage device such as memory. The storage 254 may be configured to store the key signal 101 created from the bits obtained from the random number generator 250 and the basis choice, e.g., rectilinear basis or diagonal basis. As shown, the encoder 120 and TX controller 115 are separate however, in other aspects, the devices may be integrated.

The classical communication network interface 256 may be either for wired or wireless communication. The hardware included in the classical communication network interface 256 may depend on the medium for the classical channel 108 and communication protocol. For example, if the medium is free-space and the protocol is wireless, then the classical communication network interface 256 may include a wireless interface such as a wireless LAN interface. When the medium is a fiber optic cable, the classical communication network interface 256 may comprise one or more lasers for transmitting infrared optical pulses. The classical communication network interface 256 may also comprise one or more photodiodes tuned to receive infrared pulses from the classical communication network interface 296 in the RX controller 180. The processor 252 may control the one or more lasers and bias the photodiodes. In other aspects, the classical communication network interface 256 may comprise an interface for other types of wired communications. The processor 252 may also be configured to generate the key signal 101 from the values (N values) received from the random number generator 250.

The RX device 106 may comprise a modulator 130, a first polarization-beam splitter (PBS) 135, a first conjugate homodyne detector 150A, a second conjugate homodyne detector 150B, a decoder 160, and an RX controller 180. The first conjugated homodyne detector 150A may also be referred to as Do and the second conjugated homodyne detector 150B may also be referred to as $D_1$.

The modulator 130 may be positioned in the path of the quantum channel 104. The modulator 130 may comprise optics such as variable waveplates, or phase modulators to rotate the polarization of the photons in the quantum signal 121. The PBS 135 may be positioned in the optical path between the modulator 130 and the homodyne detectors 150A, 150B ($D_0$ and $D_1$).

The RX device 106 may further include a laser 140 and a second PBS 145. The laser 140 may be configured to emit light which acts as local oscillator signal 141 for the optical homodyne detectors. In some implementations, the local oscillator signal 141 is pulsed and has a pulse repetition rate $f_o$ that matches the source rate $f_s$.

In some aspects, each of the first and second conjugate homodyne detectors 150A, 150B may comprise shot-noise limited balanced photodiodes ($BD_1$ and $BD_2$) with a bandwidth of 5 GHz. These photodiodes can be operated at room temperature. Each conjugate homodyne detector 150A, 150b may also comprise multiple beam splitters $BS_1$-$BS_4$. Each conjugate homodyne detector 150A, 150B may also comprise a phase shift $\pi/2$.

FIG. 3 illustrates a diagram of a decoder 160 in accordance with aspects of the disclosure. The decoder 160 may comprise an analog to digital converter (ADC) 270, a processor 272 and a storage 274. The ADC 270 may be configured to receive the analog detection signals (e.g., conjugate quadratures X, P) from the conjugate homodyne detectors 150A, 150B and digitize the signals for processing by the processor 272. The digitized signals may be of a fixed number of bits, such as 8, 12 or 16 bits. In some aspects, the ADC 270 may be incorporated in the conjugate homodyne detectors 150A, 150B. The processor 272 may be configured to calculate a measurement value from the conjugate quadratures X, P for each conjugate homodyne detector 150A, 150B ($Z_A$ and $Z_B$) for each of the sequence of detections. The processor 272 may also configured to determine a raw-key signal 161 and a distribution of photon number 171 based on the calculated measurement values.

The storage 274 may configured to store the digitize signals quadratures X, P, the calculated measurement value $Z_A$ and $Z_B$, the determined raw-key signal 161 and the distribution of photon number 171. In some aspects, certain values may be discarded without storage as described herein.

Figure 4:
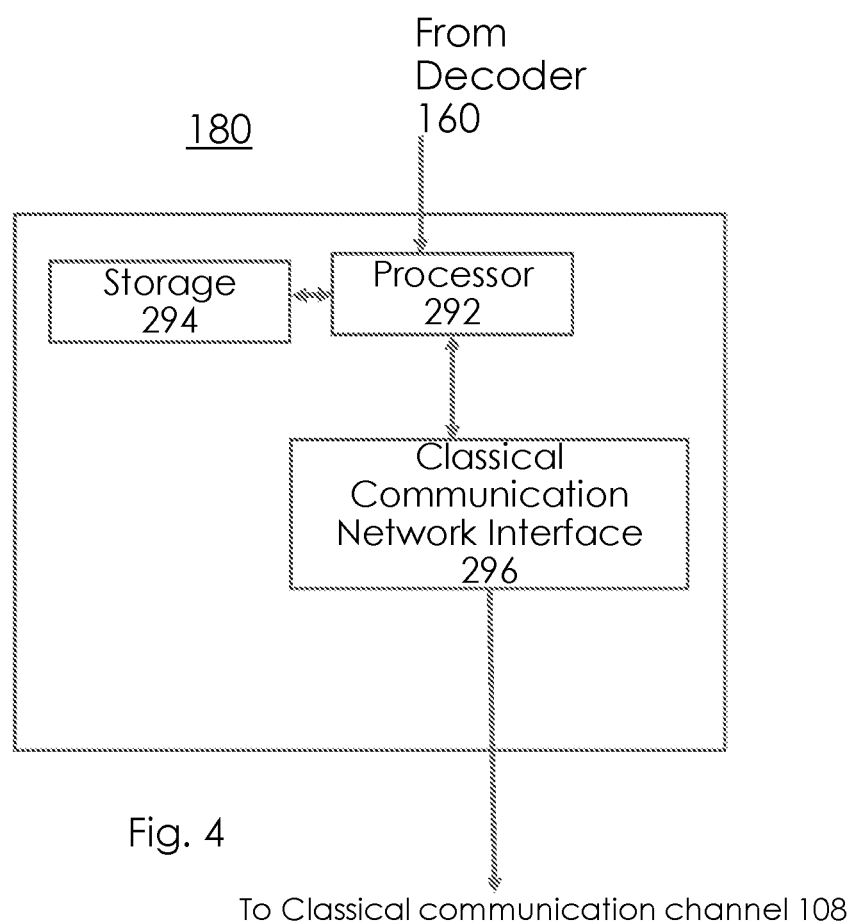
FIG. 4 illustrates a diagram of a RX controller in accordance with aspects of the disclosure.

FIG. 4 illustrates a diagram of a RX controller 180 in accordance with aspects of the disclosure. The RX controller 180 may comprise a processor 292, a storage 294 and a classical communication network interface 296. The classical communication network interface 296 may be the same as the network interface 256 in the TX controller 115. The processor 292 may be configured to control the classical communication network interface 296 to request the TX device 102 for a subset of bits from the key signal 101, calculate a gain Q 191, a quantum bit error rate E 201 and a secure-key rate R and generate a final secure key K. In some aspects, the processor 292 of the RX controller 180 may receive the determined raw-key signal 161 and the distribution of photons 171 from the decoder 160. The storage 294 may be configured to store the received determined raw-key signal 161 and the distribution of photons 171, the calculated gain Q 191, the quantum bit error rate E 201, the secure-key rate R 211 and the subset of bits received from the TX controller 115 in response to the request.

Figure 5A:
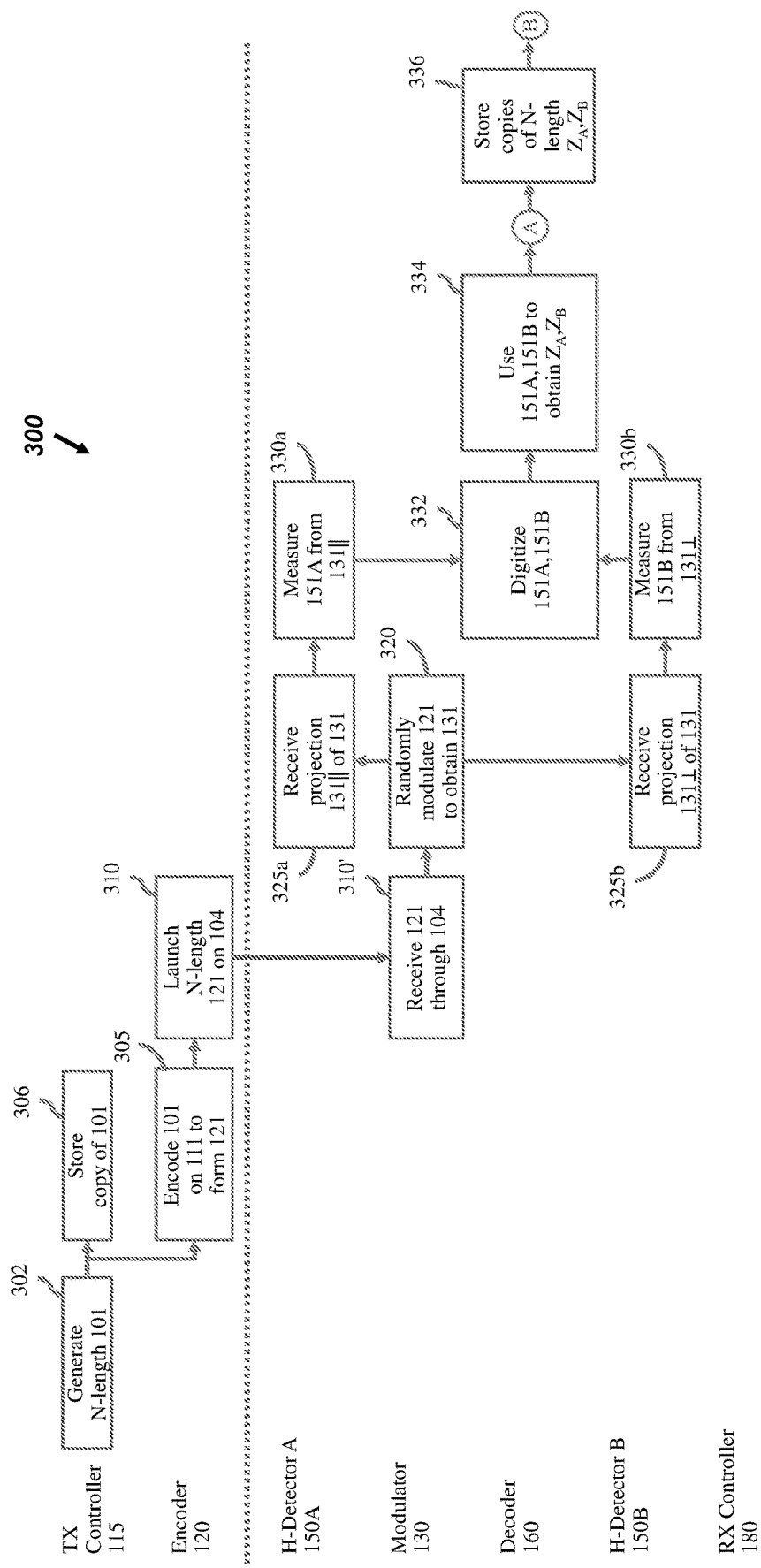
FIGS. 5A-5C illustrates a flowchart of an example process for generating a secret key in accordance with aspects of the disclosure.
Figure 5B:
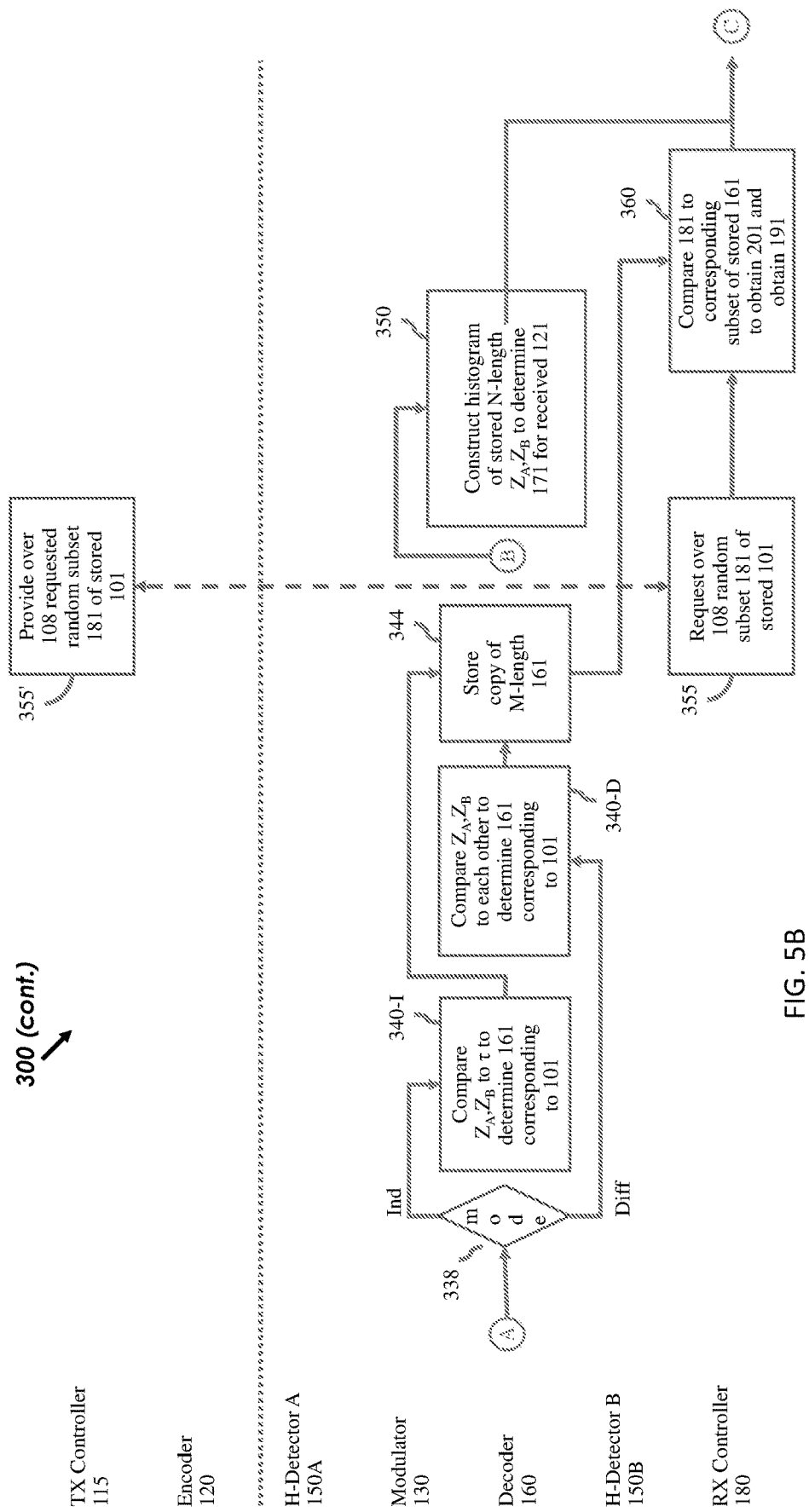
Figure 5C:
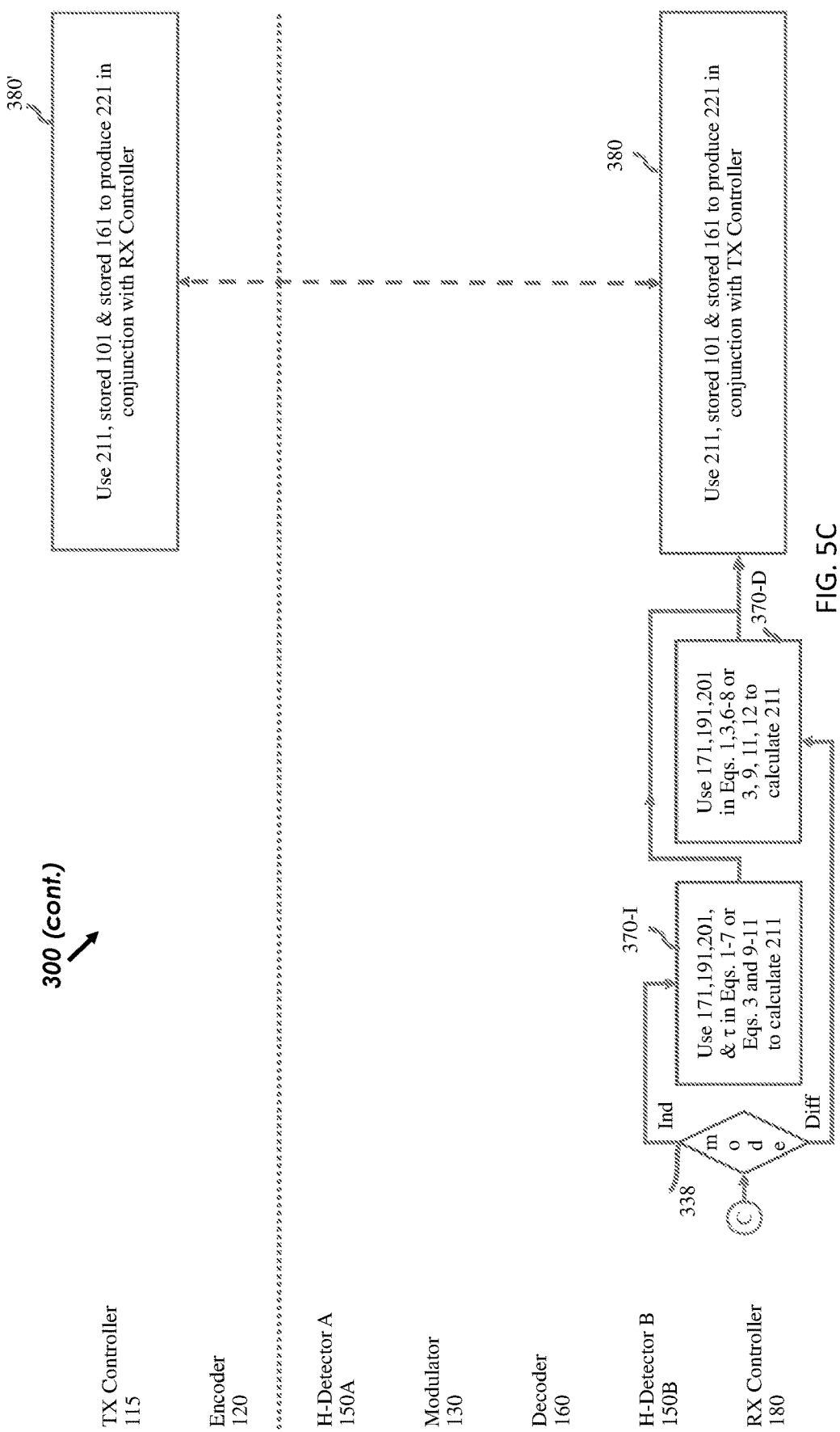

FIGS. 5A-5C illustrate a flowchart of an example process 300 for generating a secure key K in accordance with aspects of the disclosure. In some implementations, the process 300 may be performed by a sender entity, which may be referred to as Alice, which uses the TX device 102, and by a receiver entity, which may be referred to as Bob, which uses the RX device 106. As described below, the process 300 includes communications between the TX device 102 and the RX device 106 that are carried out through the insecure quantum communication channel 104 and the classical communication channel 108. In the process 300 it is assumed that an eavesdropper entity, which may be referred to as Eve, can interfere in any way with the insecure quantum communication channel 104. For example, Eve can use its own transceiver to either "read" the communications carried out over the insecure quantum communication channel 104 by intercepting and then resending such communications, and/or alter at least some of the communications carried out over the insecure quantum communication channel 104 by intercepting such communications, modifying them, and then resending the altered communications. As another example, Eve can use its own transceiver to flood either Alice's TX device 102 to determine the encoder 120's state, and/or Bob's RX device 106 to determine the modulator 130's state. As described below, by performing the process 300, Alice's TX device 102 and Bob's RX device 106 can potentially thwart these and other type of interferences performed by Eve on the insecure quantum communication channel 104.

At 302, the processor 252 in the TX controller 115 generates a key signal 101 having a bit rate $f_{BR}$ equal to the source rate $f_s$. The key signal 101 may be a binary signal consisting of a sequence of 0s and 1s of length N, where $10^4 \leq N \leq 10^6$. The binary signal may be generated based on the output of the random number generator 250.

At 305, the encoder 120 encodes the key signal 101 received from the processor 252 in the TX controller 115 on the photon sequence 111 received from the photon source 110 to form a quantum signal 121. In an aspect of the disclosure, the encoder 120 may use a discrete-variable encoding protocol. In some aspects, the discrete-variable encoding protocol is a polarization encoding protocol, e.g., BB84. In this manner, the photon(s) of each of the N elements of the quantum signal 121 is polarized at 0° or 90° (rectilinear basis), 45° or 135° (diagonal basis) in accordance with the key signal 101. In some aspects, 0° may refer to a "0" bit value and 90° may refer to a "1" bit value. In some aspects, the same basis may be used for each of the N elements of the quantum signal 121. In other aspects, a different basis (rectilinear basis or diagonal basis) may be used for different elements of the quantum signal 121. The basis for each of the N elements, may be stored in storage 254 corresponding to the bit value in the key signal 101. In an aspect of the disclosure, the processor 252 in the TX controller 115 may determine the basis (rectilinear basis or diagonal basis) for each of the N elements of the quantum signal 121. The basis may be randomly determined.

At 306, the processor 252 in the TX controller 115 stores a copy of the key signal 101 as an N-length binary string $\{101_i$, where $1 \leq i \leq N\}$. In some aspects, the processor 252 may store information about the encoding basis that was used to encode each element $101_i$ of the key signal 101.

At 310, the encoder 120 launches the quantum signal 121 on the insecure quantum communication channel 104 with a transmission rate $f_T$ equal to the source rate $f_s$. At 310', the modulator 130 receives the quantum signal 121 through the insecure quantum communication channel 104. In this manner, the photons of the quantum signal 121 are transmitted from the TX device 102 to the RX device 106 in N transmissions, each transmission consisting of a single element of the quantum signal 121.

At 320, the modulator 130 randomly modulates the received quantum signal 121 to obtain a modulated quantum signal 131 having the transmission rate $f_T$. In some implementations, the photon(s) of each transmission is(are) either left unrotated (first polarization-modulation basis) or is(are) rotated by 45° (second polarization-modulation basis) on a random basis. Whether the transmission is modulated may be stored in the storage 274 in the decoder 160 (information regarding which polarization-modulation basis was used for each element). In some aspects, this information may also be stored in storage 294 in the RX controller 180. In an aspect of the disclosure, the processor 272 in the decoder 160 may determine whether to rotate an element. The first PBS 135 projects the modulated quantum signal 131 in either a ∥-polarization to obtain a parallel-polarized quantum signal 131∥ or a ⊥-polarization to obtain an orthogonal-polarized quantum signal 131⊥.

At 325a, the first conjugate homodyne detector 150A receives the parallel-polarized quantum signal 131∥ at a rate $f_D$ equal to the transmission rate $f_T$. Concurrently at 325b, the second conjugate homodyne detector 150B receives the orthogonal-polarized quantum signal 131⊥ at the same rate $f_D$ as the first conjugate homodyne detector 150A. The received quantum signals 131⊥, 131∥ are combine with respective LO signals 141⊥, 141∥. Signals 121, 131, 131∥, 131⊥. 141∥, 141⊥ are optical signals.

At 330a, the first conjugate homodyne detector 150A simultaneously measures conjugate quadratures X, P of the parallel-polarized quantum signal 131∥ as a first measurement signal 151A. In aspect of the disclosure, the first measurement signal 151A is a sequence of N pairs of analog measurement values corresponding to the conjugate quadratures X, P of the parallel-polarized quantum signal 131∥. Concurrently at 330b, the second conjugate homodyne detector 150B measures conjugate quadratures X, P of the orthogonal-polarized quantum signal 131⊥ as a second measurement signal 151B. In an aspect of the disclosure, the second measurement signal 151B is another sequence of N pairs of analog measurement values corresponding to the conjugate quadratures X, P of the orthogonal-polarized quantum signal 131⊥. Signals 151A, 151B are analog signals.

At 332, the ADC 270 in the decoder 160 digitizes the first measurement signal 151A, on a pair-by-pair basis as it is being measured by the first conjugate homodyne detector 150A. The ADC 270 in the decoder 160 also digitizes the second measurement signal 151B, on a pair-by-pair as it is being measured by the second conjugate homodyne detector 150B.

At 334, the processor 272 in the decoder 160 combines each pair of the conjugate quadratures X, P of the first measurement signal 151A into a respective measurement $Z_A = X^2 + P^2$. Each measurement is $Z_{A_i}$, where $1 \leq i \leq N$, corresponds to the photon number per $i^{th}$ reception from among the N receptions by the RX device 106 of the quantum signal 121 as detected by the first conjugate homodyne detector 150A. Concurrently, the processor 272 in the decoder 160 combines each pair of the conjugate quadratures X, P of the second measurement signal 151B into a respective measurement $Z_B = X^2 + P^2$. Each measurement is $Z_{B_i}$, where $1 \leq i \leq N$, corresponds to the photon number per $i^{th}$ reception from among the N receptions by the RX device 106 of the quantum signal 121 as detected by the second conjugate homodyne detector 150B. In some aspects of the disclosure, the processor 272 determines each measurement is $Z_{A_1}$ and each measurement is $Z_B$ in real time as the values are digitizes. As such each measurement may be stored in the storage (at 336) in real time. In other aspects, the processor 272 may wait until all of the values are digitized to determine each measurement of $Z_{A_i}$ and each measurement of $Z_{B_i}$.

At 336, the processor 272 in the decoder 160 may stores a copy of the first set of measurements $Z_A$ as an N-length digital string $\{Z_{A_i}, \text{where } 1 \leq i \leq N\}$, and a copy of the second set of measurements $Z_B$ as an N-length digital string $\{Z_{B_i}, \text{where } 1 \leq i \leq N\}$ in storage 274. As noted above, the determination and storage may be in real time, thus, 334, 336 may be repeated N times.

In an aspect of the disclosure, the RX device 106 (decoder 160) may be set in different detection modes. For example, the RX device 106 (decoder 160) may be set in an independent detection mode or a differential detection mode. In an independent detection mode, a raw-key signal 161 may be generated based on the independent measurements $Z_A$, $Z_B$. In the differential detection mode, the raw-key signal 161 may be generated based on the joint measurements $Z_A$, $Z_B$.

Figure 9:
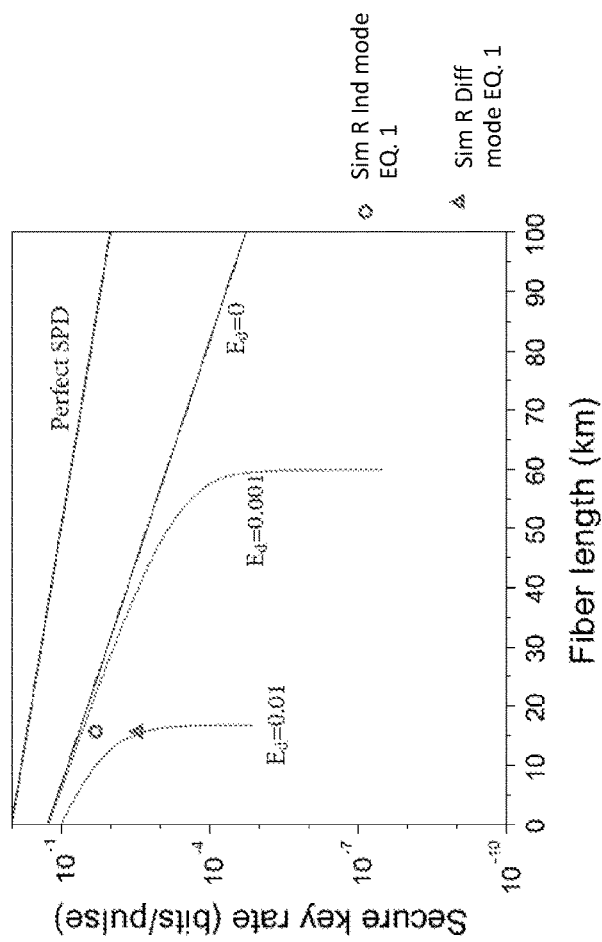
FIG. 9 illustrates simulation results for a secure-key rate as a function of fiber length for different polarization misalignment where the raw-key rate is determined using differential detection mode in accordance with aspects of the disclosure in comparison with a secure-key rate for a perfect single photon detector.
Figure 11:
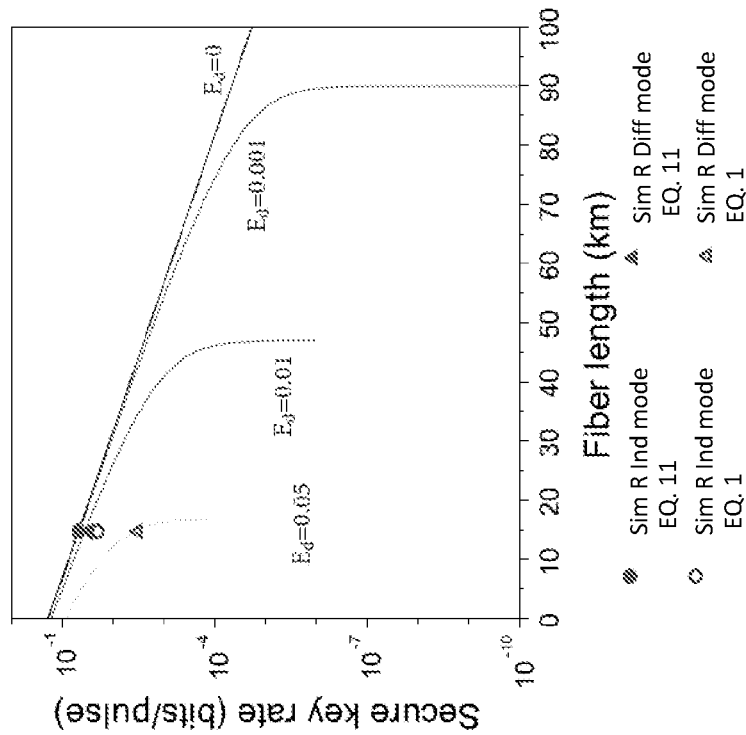
FIG. 11 illustrates additional simulation results for a secure-key rate as a function of fiber length for different polarization misalignments where the raw-key rate is determined using differential detection mode in accordance with aspects of the disclosure where the secure-key rate determined differently from the secure-key rate in FIG. 9.
Figure 10:
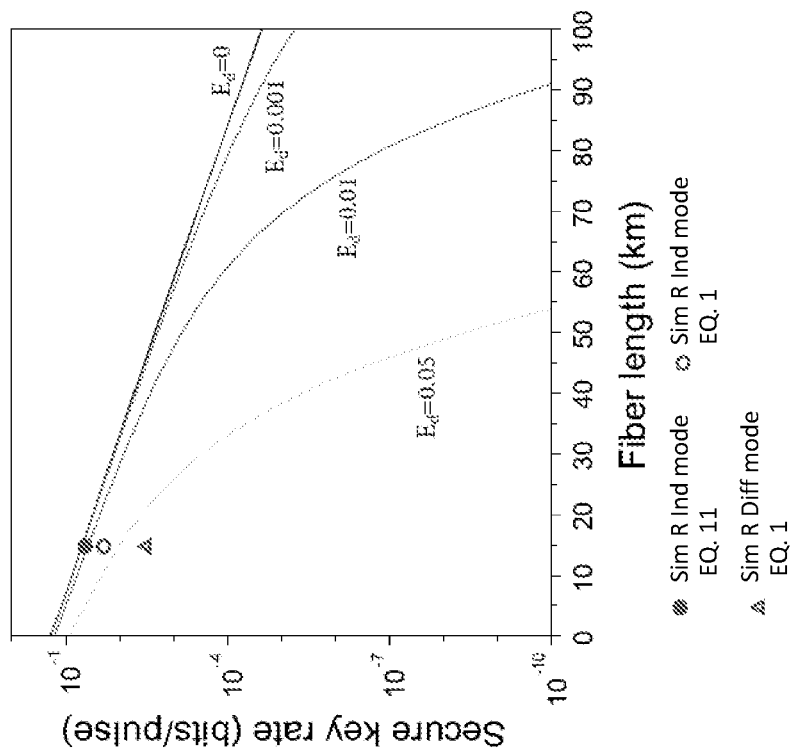
FIG. 10 illustrates additional simulation results for a secure-key rate as a function of fiber length for different polarization misalignments where the raw-key rate is determined using independent detection mode in accordance with aspects of the disclosure where the secure-key rate determined differently from the secure-key rate in FIG. 8.

In an aspect of the disclosure, the detection mode may be set during calibration and initial deployment. For example, the detection mode may be set based on the hardware type in the decoder 160 and the RX controller 180. There is a tradeoff in computational complexity and processing for generating a secure key K using independent detection mode and the security of the key. As shown in FIGS. 9-11, there is a higher secure key rate R for the independent detection mode. However, independent detection mode is more computationally complex than the differential detection mode. Therefore, when the hardware type has higher processing power, the independent detection mode may be initially set and when the hardware type has lower processing power, the differential detection mode may be set.

In other aspects of the disclosure, the mode may be set on an on-demand basis based on a target security needs for the secure key K 221. For example, different messages sent over a classical communication channel 108 may need higher or lower security for the encryption. Since the strength of the secure key K 221 is higher when the secure-key rate R 211 is higher, when a higher security is needed, the independent detection mode may be set and when a lower security is needed, the differential detection mode may be set. In some aspects, the target security may be set by a user. In some aspects, a system operator may charge a different amount for generating secure keys K 221 using independent detection mode verses differential detection mode. In this aspect of the disclosure, different detection modes may be used to generate different secure keys K 221. In some aspects, different transmission devices 102 may have an assigned detection mode such that different users may have different level of security (in a system with multiple TX devices 102). In other aspects, the same TX device 102 may have multiple users and each user may be assigned a different detection mode.

In other aspects of the disclosure, the detection mode may be set based on network traffic. For example, when the network traffic is larger (high bandwidth), the differential detection mode may be set.

At S338, the processor 272 in the detector 160 determines which mode the RX device 106 is set. When the RX device 106 is set in the independent detection mode, the process 300 moves to 340-I and when the RX device 106 is set in the differential detection mode, the process 300 moves to 340-D. Similar to 334, 340-I or 340-D may be executed in real time without waiting for all N values of $Z_A$, $Z_B$.

When the processor 272 determines that the independent detection mode is set, at 340-I, the processor 272 compares each measurement $Z_A$ with a predetermined threshold r to determine whether the measurement $Z_A$ corresponds to detection of at least a photon by the first conjugate homodyne detector 150A. Additionally, the processor 272 compares each measurement $Z_B$ with the same predetermined threshold r to determine whether the measurement $Z_B$ corresponds to detection of at least a photon by the second conjugate homodyne detector 150B.

In an aspect of the disclosure, the predetermined threshold r may be set to maximize the secure-key rate R at a given distance. By choosing an appropriate predetermined threshold τ, either a high detection efficiency or a low dark count probability may be achieved but not both. The detection efficiency $η_D$ is defined as the conditional probability that a detector 150A, 150B reports a non-vacuum state given the input is a single photon Fock state. The dark count probability $v_D$ is defined as the conditional probability that the detector 150A, 150B reports a non-vacuum state given the input is a vacuum. The predetermined threshold τ is used to enable a photon counting mode for the conjugate homodyne detector 150A, 150B given the input of a continuous measurement in the independent detection mode. The threshold is used to map the continuous measurement into a click or no-click. When $Z_A$ or $Z_B$ is larger than the threshold, it maps to a click. On the other hand, when $Z_A$ or $Z_B$ is smaller than the threshold, it maps to no-click. A ratio is defined as Ra=$η_D/v_D$. The ratio grows linearly with the predetermined threshold τ. Ra=τ+1.

Figure 6:
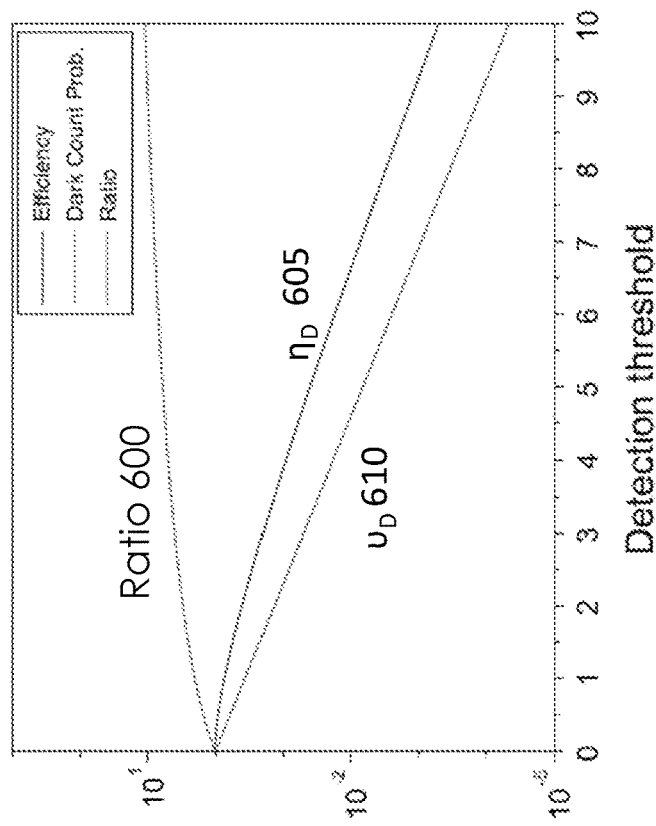
FIG. 6 illustrates simulation results of detection efficiency, dark count probability and the ratio of them as a function of a detection threshold.

FIG. 6 shows an example of the ratio 600, $η_D$ 605 $_{and}$ $v_D$ 610 for simulation results. As can be seen, the detection efficiency drops when the predetermined threshold r increases. As can be seen in FIG. 6, the Ratio 600 is less than about 10 in a region where the detection efficiency is not too low. It is noted that, a state-of-the-art SPD may provide a ratio of as high as $10^8$. While the ratio in the disclosed scheme is lower, given the use of the photon distribution and the improved security analysis, the secure-key rate R 211 is still improved over known systems with SPD using BB84 QKD.

In an aspect of the disclosure, the predetermined threshold r may be chosen, e.g., in a range 1<τ<10, to maximize the secure-key rate R 211 for a given length of the insecure quantum communication channel 104. The predetermined threshold τ is based on channel loss. The predetermined threshold τ may be determined using simulation results. For example, the simulation may start with a given fiber length L (or distance between the TX device 102 and the RX device 106 in free space). The simulation may start with L equal to a minimum value such as, but not limited to 1 km. For the given fiber length L (or distance in free space), a secure-key rate R 211 may be determined using EQ. 1 (as shown below) (or in other aspects EQ. 11). Initially, a minimum value for predetermined threshold τ may be set. For example, the predetermined threshold τ may be set as 1. Using this value, the secure-key rate R 211 is calculated. The calculation may be repeated for another predetermined threshold τ (higher value) for the same fiber length L. This process may be repeated for the same distance until the predetermined threshold τ reaches a maximum allowable value. For example, the predetermined threshold τ maximum value may be 10. For a given fiber length L, the predetermined threshold τ corresponding to the highest secure-key rate R 211 may be set for the fiber length L. This process may be repeated for different fiber lengths until a maximum fiber length L for the system is reached. The predetermined threshold τ for each fiber length may be stored in the storage 274. When the system 100 is deployed and the length of the fiber (L is known), the processor 272 may retrieve the predetermined threshold τ from storage 274 corresponding to the fiber length L (or distance in free space between the TX device 102 and the RX device 106).

In an aspect of the disclosure, the processor 272 in the decoder 160 classifies as valid, and retains in the storage 274, only pairs of measurements $Z_A$, $Z_B$ for which one does, and the other one does not, exceed the predetermined threshold τ. The processor 272 may discard, pairs of measurements $Z_A$, $Z_B$ for which both do, or do not, exceed the predetermined threshold τ. For example, the processor 272 may remove measurements $Z_A$, $Z_B$ from the storage 274.

In this manner, the processor 272 in the decoder 160 may form a raw-key signal 161 as a binary signal consisting of a sequence of 0s and 1s of length M, where the 0s correspond to the retained measurements for which $Z_A$<τ<$Z_B$ and 1s correspond to the retained measurements for which $Z_B$<τ<$Z_A$. The length M of the raw-key signal 161 may be smaller than length N of the key signal 101, e.g., M can be 0.1×N, 0.01×N, 0.001×N, or even smaller.

When the processor 272 determines that the differential detection mode is set, at 340-D, the processor 272 in the decoder 160 compares each measurement $Z_A$ with the respective measurement $Z_B$ to determine whether the measurement $Z_A$ corresponds to detection of at least one photon by the first conjugate homodyne detector 150A while the measurement $Z_B$ corresponds a detection of no photon by the second conjugate homodyne detector 150B, or the measurement $Z_B$ corresponds to detection of at least one photon by the second conjugate homodyne detector 150B while the measurement $Z_A$ corresponds a detection of no photon the first conjugate homodyne detector 150A. For this reason, all N pairs of measurements $Z_A$,$Z_B$ may be retained in the storage 274. In this manner, the processor 272 in the decoder 160 forms a raw-key signal 161 as a binary signal consisting of a sequence of 0s and 1s of length M=N, where the 0s correspond to the pairs of measurements for which $Z_A$<$Z_B$ and is correspond to the pairs of measurements for which $Z_B$<$Z_A$.

At 344, the processor 272 in the decoder 160 stores a copy of the raw-key signal 161 as an M-length binary string {161$_i$, where 1≤i≤M} in the storage 274.

At 350, the processor 272 in the decoder 160 constructs a histogram of the stored first and second sets of measurements $Z_A$,$Z_B$. In an aspect of the disclosure, the processor 272 waits until all of the N values of $Z_A$, $Z_B$ are determined to determine the histogram. In some aspects of the disclosure, even invalid values of $Z_A$, $Z_B$ (in the independent detection mode) may be used to generate the histograms. The processor 272 may determine, from the constructed histogram, a distribution 171 of the photon numbers per reception for the received quantum signal 121. The determined distribution 171 may provide joint probabilities $P_{jk}$ that if the TX device 102 had launched j photons as part of one of the N transmissions of the quantum signal 121, then the RX device 106 has received k photons, where j, k=0, 1, 2, . . . , for instance.

In some aspects of the disclosure, certain processes may be executed by the processor 292 in the RX controller 180 instead of the processor 272 in the decoder 160.

In an aspect, the processor 272 may transfer the determined distribution 171 and the raw-key signal 161 to the processor 292 in the RX controller 180. In other aspects, the processor 292 may have access to the storage 274.

At 355, the processor 292 in the RX controller 180 determines a random subset 181 of the transmissions (bits of the key signal 101) to request the TX controller 115 to send the actual values of the bits in the key signal 101 that correspond to the transmissions. The random subset 181 may have indices several orders of magnitude smaller than the number of transmissions (size of the key signal is N). For example, when the size N=100,000, the random subset 181 may be on the order of 100 such that P=100, where P is the number of indices in the request. The request may be sent from the RX controller 180 to the TX controller 115 via the classical communication channel 108 (via the respective interfaces). The request may include the specific set of indices (number) randomly selected. In an aspect of the disclosure, while the indices may be randomly selected, the processor 292 may only include index numbers corresponding to transmissions which were valid and stored. For example, for N=100000 and P=100, the processor 292 may request from the TX controller 115 indices {3, 29, 75, 144, 237, 298, 331, . . . , 98384} chosen randomly from indices 1, 2, 3, . . . , 100,000.

The request is received by the processor 252 in the TX controller 115 via the classical communication network interface 256. At 355', the processor 252 provides to the RX controller 180, via the classical communication channel 108, a response. The response may include the random subset 181 of the stored key signal 101. The random subset 181 includes the actual bit values (which were encoded). For example, the processor 252 may retrieve the corresponding bit values from the storage 254 for the indices {3, 29, 75, 144, 237, 298, 331, . . . , 98384} of the stored key signal 101. The values may be, for example, {1, 1, 0, 0, 0, 1, 0, . . . , 0}. The response may also include the corresponding state basis (e.g., rectilinear or diagonal) for the bit value.

At 360, the processor 292 in the RX controller 180 compares the received random subset 181 of the key signal 101 to a corresponding subset of the stored raw-key signal 161 to obtain a quantum bit error rate E 201 for the transmission of the quantum signal 121 over the insecure quantum communication channel 104. The comparison is on an element by-element basis. When the received random subset 181 is compared there may be indices where the corresponding pair of measurements $Z_A, Z_B$ was discarded at 340-I. The comparison may use an N/A for the discarded measurement. To perform the comparison, the processor 292 in the RX controller 180 considers which of the first or second polarization-encoding basis was used by the encoder 120 to encode each element of the random subset 181 of the key signal 101 and information about which of the first or second polarization-modulation basis was used by the modulator 130 to randomly modulate each reception of the quantum signal 121. The processor 292 in the RX controller 180 obtains the quantum bit error rate E 201 as a ratio of a number of errors $N_{e_{K,RK}}$ between the random subset 181 of the key signal 101 and the corresponding subset of the raw-key signal 161 to a total number of elements $N_K$ of the random subset 181, e.g., $$E = \frac{N_{e_{K,RK}}}{N_K}.$$

The gain Q 191 is a ratio of a number of valid receptions to a number of total transmissions, e.g., Q=

$$\frac{M}{N}.$$

In the differential detection mode, all receptions are valid, whereas in the independent detection mode, as noted above, certain receptions are deemed invalid.

The processor 292 in the RX controller 180 may calculate a secure-key rate R 211 based in part of the gain Q 191 and the quantum bit error rate E 201. In an aspect of the disclosure, the secure-key rate R 211 may be calculated using the following equation (regardless of the detection mode):

$$R = Q_{1,0} + Q_{1,1}[1 - H_2(\varepsilon^{(U)})] - QH_2(E) \tag{1}$$

where $H_2(x) = -x \log_e(x) - (1-x) \log_2(1-x)$ is the Shannon entropy. In EQ. 1, the terms $Q_{1,0} + Q_{1,1} - QH_2(E)$ represent the mutual information between the TX device 102 and the RX device 106, and the term $Q_{1,1}H_2(\varepsilon^{(U)})$ represents the mutual information between a third party device (also referred to as Eve) and the RX device 106.

Referring first to the mutual information between the TX device 102 and the RX device 106, parameter Q represents the gain Q 191, and parameter E represents the quantum bit error rate E 201, both of which have been determined at 360.

Parameter $Q_{1,0}$ represents the contribution to the gain when the TX device 102 had launched 1 photon and the RX device 106 has received none. $Q_{1,0} = P_{1,0} Y_{1,0}$ may be determined as a product of a corresponding joint probability $P_{1,0}$ and a corresponding yield, aka conditional detection probability, $Y_{1,0}$. Parameter $Q_{1,1}$ represents the contribution to the gain when the TX device 102 had launched 1 photon and the RX device 106 has received 1 photon. $Q_{1,1} = P_{1,1} Y_{1,1}$ may be determined as the product of the corresponding joint probability $P_{1,1}$ and the corresponding yield $Y_{1,1}$. Both joint probabilities $P_{1,0}$ and $P_{1,1}$ are available from the photon-number distribution 171 that has been determined at 350.

Referring now to the mutual information between Eve and the RX device 106, parameter $\varepsilon^{(U)}$ represents an upper bound of a latent variable E that can be determined as shown below.

The manner in which certain parameters in EQ. 1 may be calculated may be different depending on the detection mode and therefore, the processor 292 once again needs to know the detection mode (338).

For example, at 370-I (independent detection mode), the yield $Y_{1,0}$ and the corresponding quantum bit error rate $E_{1,0}$ may be determined using the predetermined threshold $\tau$ in the following manner:

where $$Y_{1,0} = 2 \int_0^\tau P_Z(z_0 \mid 0) dz_0 \times \int_\tau^\infty P_Z(z_1 \mid 0) dz_1 \tag{2}$$

$$P_Z(z_i \mid j) = e^{-z_i} \frac{z_i^j}{j!} \tag{3}$$

i=0 or 1 and j=0 or 1. Using EQ. 3 in EQ. 2, the yield $Y_{1,0} = 2(1 - e^{-\tau}) e^{-\tau}$. The corresponding quantum bit error rate is $E_{1,0} = 0.5$.

Similarly, under the assumption that the first and second conjugate homodyne detectors 150A, 150B are identical, the yield $Y_{1,1}$ is independent of the polarization state of the received photon, and may be determined by $$Y_{1,1} = \int_0^\tau P_Z(z_0 \mid 1) dz_0 \times \int_\tau^\infty P_Z(z_0 \mid 0) dz_1 + \int_\tau^\infty P_Z(z_0 \mid 1) dz_0 \times \int_0^\tau P_Z(z_1 \mid 0) dz_1 \tag{4}$$

Using EQ. 3 in EQ. 4, the yield $Y_{1,1}=(\tau+2)\,e^{-\tau}-2(\tau+1)e^{-2\tau}$. The corresponding quantum bit error rate may be determined by $$E_{1,1} = (1-\varepsilon)\frac{\int_0^\tau P_Z(z_0\mid 1)dz_0 \times \int_\tau^\infty P_Z(z_1\mid 0)dz_1}{Y_{1,1}} + \varepsilon\frac{\int_0^\tau P_Z(z_0\mid 0)dz_0 \times \int_\tau^\infty P_Z(z_1\mid 1)dz_1}{Y_{1,1}} \quad (5)$$

Using EQ. 3 in EQ. 5, the quantum bit error rate $E_{1,1} = [(\varepsilon\tau+1)e^{-\tau}-(\tau+1)e^{-2\tau}]/Y_{1,1}$. Based on the following definition $$E = \frac{1}{Q}\left(Q_{1,0}E_{1,0} + Q_{1,1}E_{1,1} + \sum_{j=2}^{\infty} Q_{1,j}E_{1,j}\right) \quad (6)$$

the quantum bit error rate contribution $E_{1,1}$ has an upper bound given by $$E_{1,1} \leq \frac{QE - Q_{1,0}E_{1,0}}{Q_{1,1}} \quad (7)$$

where both Q and E are determined at 360. EQs. 2-7 hold for both first and second polarization-modulation basis which were used by the modulator 130 to randomly modulate each reception of the quantum signal 121. By using the upper bound of $E_{1,1}$ from EQ. 7 in $E_{1,1}=[(\varepsilon\tau+1)\,e^{-\tau}-(\tau+1)e^{-2\tau}]/Y_{1,1}$, the processor 292 may obtain an upper bound $\varepsilon^{(U)}$ for the latent variable $\varepsilon$. A lower bound $\varepsilon^{(L)}$ for the latent variable E can be attributed to a polarization misalignment $E_d$. In some aspects, potential values for $E_d$ may be 0.001, 0.01, 0.05, or other values.

For the differential detection mode, the first and second conjugate homodyne detectors 150A, 150B are operated in a deterministic fashion, such that for each transmission, either bit 0 or bit 1 is determined. For this reason, at 370-D, both $Y_{1,0}=Y_{1,1}=1$. So, $Q_{1,0}=P_{1,0}$, $Q_{1,1}=P_{1,1}$, and $Q=1$. While $E_{1,0}=0.5$ like for the independent detection mode, the quantum bit error rate contribution $E_{1,1}$ for the differential detection mode may be determined by $$E_{1,1}=(1-\varepsilon)\int_0^\infty P_z(z_0|1)\int_{z_0}^\infty P_z(z_1|0)dz_1dz_0+\varepsilon\int_0^\tau P_z(z_0|0)\int_{z_0}^\infty P_z(Z_1|1)dz_1dz_0 \quad (8)$$

Using EQ. 3 in EQ. 8, the quantum bit error rate is determined to be $$E_{1,1} = \frac{1}{4} + \frac{\varepsilon}{2}.$$

Again, once an upper bound of $E_{1,1}$ has been obtained from EQs. 6-7, the processor 292 in the RX controller 180 can obtain from $$E_{1,1} = \frac{1}{4} + \frac{\varepsilon}{2}$$

an upper bound $\varepsilon^{(U)}$ for $\varepsilon$. As in the independent detection mode, a lower bound $\varepsilon^{(L)}$ for E can be attributed to the polarization misalignment $E_d$. For the differential detection mode, potential values for $E_d$ can be between 0.001 and 0.01.

Referring again to EQ. 1, note that representing the mutual information between Eve and the RX device 106 as the term $Q_{1,1}H_2(E^{(U)})$ is a conservative approach. Due to the detector quantum noise of the first and second conjugate homodyne detectors 150A, 150B, the mutual information between Eve and the RX device 106 is upper bounded by the term $Q_{1,1}H_2(\varepsilon^{(U)})$. For this reason, the mutual information between Eve and the RX device 106 represented in terms of another latent variable E satisfies the following expression $$1-H_2(\epsilon) \leq H_2(\varepsilon) \quad (9)$$

For the independent detection mode, the processor 292 in the RX controller 180 can determine a quantum bit error rate E', corresponding to $E_{1,1}$ from EQ. 5, as a function of the latent variable $\epsilon$ as follows:

$$E' = (1-\epsilon)\frac{\int_0^\tau P_Z(z_0\mid 1)dz_0 \times \int_\tau^\infty P_Z(z_1\mid 0)dz_1}{Y_{1,1}} + \epsilon\frac{\int_0^\tau P_Z(z_0\mid 0)dz_0 \times \int_\tau^\infty P_Z(z_1\mid 1)dz_1}{Y_{1,1}} \quad (10)$$

Using EQ. 3 in EQ. 10, the quantum bit error rate $E'=[(\epsilon\tau+1)\,e^{-\tau}-(\tau+1)e^{-2\tau}]/Y_{1,1}$. The processor 292 in the RX controller 180 may determine a lower bound $\epsilon^{(L)}$ of the latent variable $\epsilon$ from EQ. 9. By using the determined lower bound $\epsilon^{(L)}$ of $\epsilon$ in $E'=[(\epsilon\tau+1)\,e^{-\tau}-(\tau+1)e^{-2\tau}]/Y_{1,1}$, the processor 292 in the RX controller 180 may obtain a lower bound $E'^{(L)}$ for the quantum bit error rate E'.

The processor 292 in the RX controller 180 calculates a secure-key rate R 211, by replacing in EQ. 2 the representation of the mutual information between Eve and the RX device 106 as the term $Q_{1,1}H_2(\varepsilon^{(U)})$ with the terms $Q_{1,1}(1-H_2(E'))$. In this manner, the secure-key rate R 211 as calculated by:

$$R=Q_{1,0}+Q_{1,1}H_2(E'^{(L)})-QH_2(E) \quad (11)$$

The processor 292 in the RX controller 180 uses EQ. 11 to calculate a secure-key rate R 211 using the parameter $E'^{(L)}$ obtained for the independent detection mode.

In an aspect of the disclosure, for the differential detection mode, the processor 292 in the RX controller 180 determines a quantum bit error rate E', corresponding to $E_{1,1}$ from EQ. 8, as a function of the latent variable $\epsilon$ by $$E'=(1-\epsilon)\int_0^\infty P_z(z_0|1)\int_{z_0}^\infty P_z(z_1|0)dz_1dz_0+\epsilon\int_0^\tau P_z(z_0|0)\int_{z_0}^\infty P_z(Z_1|1)dz_1dz_0 \quad (12)$$

Using EQ. 3 in EQ. 12, the quantum bit error rate is determined to be $$E' = \frac{1}{4} + \frac{\epsilon}{2}.$$

Again, once a lower bound of E has been obtained from EQ. 9, the processor 292 in the RX controller 180 obtains from $$E' = \frac{1}{4} + \frac{\epsilon}{2}$$

a lower bound $E'^{(L)}$ for the quantum bit error rate E'.

The processor 292 in the RX controller 180 uses EQ. 11 to calculate a secure-key rate R 211 using the parameter $E'^{(L)}$ obtained for the differential detection mode.

The calculated secure-key rate R 211 is a value that limits a maximum length n of a secure key K 221 relative to the length N of the key signal 101, i.e., n=RN. For example, if $N=10^4$ and R=0.01, then the maximum length of the secure key K 221 is n=100. As another example, if $N=10^6$ and R=0.001, then the maximum length of the secure key K 221 is n=1000.

Once the secure-key rate R 211 is determined, a secure key K 221 may be generated based on the exchange of information over the classical communication channel 108 information about the secure-key rate R 211 calculated at 370, the N-length binary string $\{101_i$, where $1 \le i \le N\}$ stored at 304 as the copy of the key signal 101, and the M-length binary string $\{161_i$, where $1 \le i \le M\}$ stored at 344 as the copy of the raw-key signal 161. The secure key K 221 may be generated at 380, 380'. The respective processors in the respective controllers exchange the information over the classical communication channel 108 via the respective interfaces. The secure key K 221 may be generated using known post-processing operations, e.g., reconciliation, privacy amplification, etc., such as described in connection with FIG. 1 of Fung et al., "Practical issue in quantum-key-distribution post-processing," arXiv:0910.0312v2 [quantum-ph] 29 Dec. 2009, which are incorporated by reference.

The secure key K 221 may be an i-length binary string $\{221_i$, where $1 \le i \le n = RN\}$. The secure key K 221 may be at most as long as the raw-key signal 161, i.e., $i \le M$.

Once the secure key K 221 is generated, the RX device 106 and the TX device 102 may use the same to conduct encrypted communications (typically over classical communication channels) in which messages exchanged between the RX device 106 and the TX device 102 are encrypted using the secure key K 221.

In an aspect of the disclosure, multiple secure keys K 221 may be generated in accordance with the above process 300 by the RX device 106 and the TX device 102, e.g., to produce a second secure key K', a third secure key K", etc., e.g., to produce a pool of multiple secure keys K 221. These multiple secure keys K 221 may be generated prior to conducting any encrypted communication. In other aspects, concurrently while the encrypted communication is being executed using one key, the RX device 106 and the TX device 102 may generated other secure keys K 221.

In some aspects, each secure key K 221 may be used to exchange a predetermined number of messages k=1, 2, ... , $k_{max}$, after which the current secure key is discarded, and the next secure key is adopted. In other aspects of the disclosure, multiple secured keys K 221 may be used to respectively encrypt different messages where the secure key used for encryption may be randomly selected.

Figure 8:
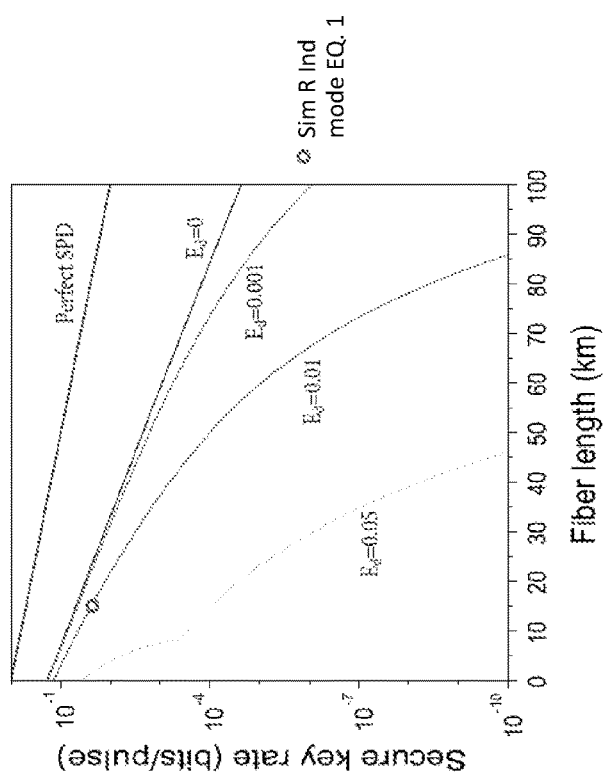
FIG. 8 illustrates simulation results for a secure-key rate as a function of fiber length for different polarization misalignments where the raw-key rate is determined using independent detection mode in accordance with aspects of the disclosure in comparison with a secure-key rate for a perfect single photon detector.

The system 100 for generating secure keys 221 (using conjugated homodyne detection) (with different polarization misalignments) was compared with a perfect SPD implementing a BB84 QKD with no polarization misalignment ($E_d=0$). FIG. 8 shows simulation results for the independent detection mode. The secure-key rates R in the simulation were determined "under normal operating conditions" with the assumption that Eve (third party device) does not "attack" (send photons to the RX device 106). In practice, Eve may impact the secure-key rate R 211 by attacking and therefore, the actual/measured secure-key rates for each fiber length L will likely be lower than the simulation results. For example, a circle on the curve for $E_d=0.01$ has been added to show a representative secure-key rate R determined by the simulation using EQ. 1 for a specific fiber length.

Figure 7:
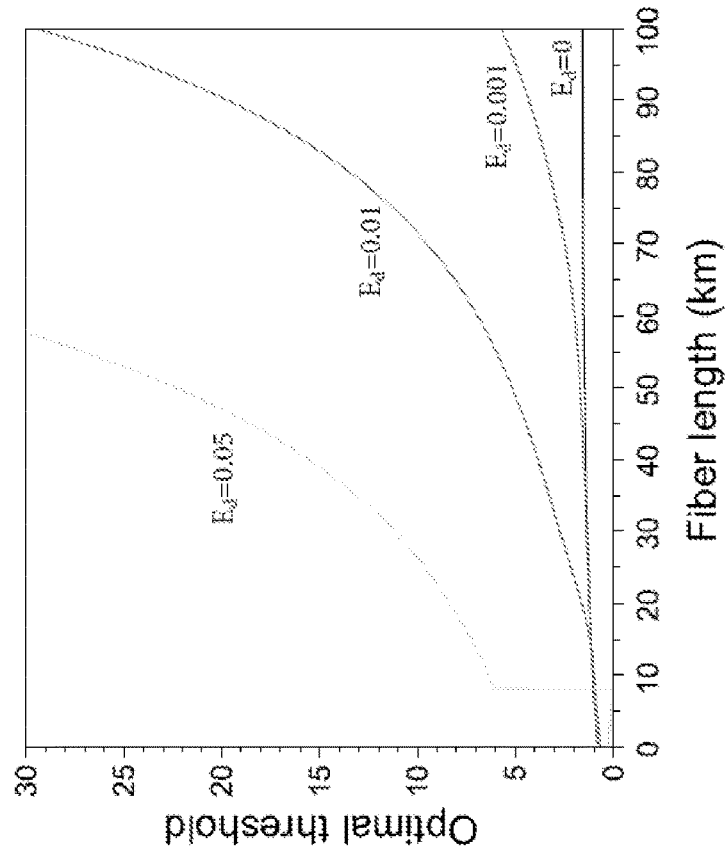
FIG. 7 illustrates simulation results of an optical detection threshold as a function of fiber length for different polarization misalignment.

Four different polarization misalignments are shown. The detection threshold τ (predetermined threshold) at each distance was optimized by maximizing the secure-key rate R. The corresponding optimal values of τ are shown in FIG. 7. As can be seen in FIG. 8, the secure-key rate R decreases as the fiber length increases for both the perfect SPD and the disclosed system under all polarization misalignments.

In the case of $E_d=0.05$, there is a jump of the optimal τ in FIG. 7 around 8.2 km, which leads to the non-differentiability on the corresponding curve in FIG. 8. In the case of $E_d=0.05$, there are two local optimal values of τ. As the distance increases, the global optimal τ switches from the first local optimum to the second one at the distance around 8.2 km, which results a jump of τ.

FIG. 9 shows simulation results for the differential detection mode. Similar to above, secure-key rates R in the simulation were determined "under normal operating conditions" with the assumption that Eve (third party device) does not "attack" (send photons to the RX device 106). A triangle has been added at a specific fiber length as representative simulation secure-key rate R based on a differential detection mode. A circle has also been added to show a comparison of simulated secure-key rates R for differential and independent detection mode for the same fiber length L. As can be seen in FIG. 9, the secure-key rate R (simulated) for the independent detection mode is higher than the secure-key rate R (simulated) for the differential detection mode. In practice, a size difference between simulated and measured secure-key rates may depend on the behavior of Eve (third party device).

Three different polarization misalignments are shown. No secure key K may be generated when $E_d=0.05$ using the differential detection mode. Comparing with the results shown in FIG. 8, while both detection modes yield similar key rates when $E_d=0$, the independent detection mode appears to tolerate higher polarization misalignment.

FIGS. 10 and 11 show simulation results for the secure-key rate R determined in accordance with other aspects of the disclosure, accounting differently for mutual information between Eve and the RX device 106 as described above using EQ. 11. Four different polarization misalignments are shown in FIG. 10 (same four as in FIG. 8). The detection threshold τ (predetermined threshold) at each distance was optimized by maximizing the secure-key rate R. FIG. 10 shows an improved secure-key rate R determined using EQ. 11 than EQ. 1 for the independent detection mode, especially for the higher polarization misalignment. Even when the polarization misalignment was assumed to be $E_d=0$, there was an improvement. A filled in circle has been added to FIG. 10 on curve $E_d=0$ to show a representation of a secure-key rate R (simulated for the independent detection mode) determined from EQ. 11. Another circle (unfilled) has also been added representing a secure-key rate R (simulated for the independent detection mode) determined from EQ. 1. As can be seen, the secure-key rate R for the same length is higher for EQ. 11 than EQ. 1 for this fiber length. A triangle was also added to show a representative secure-key rate R (simulated for the differential detection mode) determined from EQ. 1. This secure-ley rate is lower than both stimulated secure-key rates for the independent detection mode (determined either from EQ. 1 or EQ. 11).

Four different polarization misalignments are shown in FIG. 11. Using EQ. 11 as opposed to EQ. 1, a secure-key rate R was able to be determined for $E_d=0.05$. FIG. 11 shows a significant improvement in secure-key rate R determined using EQ. 11 than EQ. 1 for the differential detection mode, especially for the higher polarization misalignment. Even when the polarization misalignment was assumed to be $E_d=0$, there was an improvement. A filled in triangle has been added to FIG. 11 on curve $E_d=0.001$ to show a representation of a secure-key rate R (simulated for the differential detection mode) determined from EQ. 11. Circle (filled) has also been added representing a secure-key rate R (simulated for the independent detection mode) determined from EQ. 11. As can be seen, the secure-key rate R for the same length is higher for independent detection mode even using EQ. 11 the same fiber length. A triangle (unfilled) was also added to show a representative secure-key rate R (simulated for the differential detection mode) determined from EQ. 1. Another circle (unfilled) was also added to show a representative secure-key rate R (simulated for independent detection mode) determined from EQ. 1. As can been seen, in either mode, the secure-key rate R (simulated) is higher determined from EQ. 11 than EQ. 11.

FIGS. 8-11 show the secure-key rate R in bits/pulse. While the secure-key rate R in bits/pulse may be lower than the secure-key rate for a perfect SPD as seen in FIGS. 8 and 9, the secure-key rates R, in bits per second are relevant. In this regard, achievable secure-key rates R for the perfect SPD are limited by the maximum detection rate (due to deadtime). The maximum detection rate is typically less than 100 MHz. The secure-key rate cannot be larger than the detection rate. In contrast, by using conjugated homodyne detection the maximum detection rate is orders of magnitude larger. Given the significantly higher detection rate, higher secure-key rates (bits per second) are expected over short distances using the system 100 and process 300 in accordance with aspects of the disclosure.

The disclosed system also enables secure-key K generation (quantum key distribution) with a high secure-key rate through many different types of classical communication channels 108 such as through conventional dense wavelength-division-multiplexed fiber networks in the presence of strong classical traffic and through free-space channels due to the intrinsic filtering provided by the laser 140 in the homodyne detection which suppresses background photons.

Additionally, there is no requirement for establishing a phase reference between the TX device 102 and the RX device 106, which makes the disclosed system 100 easier to implement than other phase sensitive systems such as coherent detection schemes used in CV-QKD.

Further, the disclosed system 100 is more robust to detector side-channel attacks by Eve because communication occurs both via the insecure quantum communication channel 104 and the classical communication channel 108 as described herein. For example, a photon attack may result in a high bit error rate E 211 and may exposed Eve's presence.

Also, using the homodyne detectors 150A, 150B, any dramatic changes caused by Eve will likely be detected by the RX device 106. This is due, in part, to the RX device 106 being able to determine the photon number distribution.

Further, by using the intrinsic filtering provided by the laser 140 and by generating the local oscillator signals for the homodyne detectors 150A, 150B, from the same light source in the RX device 106, the system 100 may also be more immune to side-channel attacks such as in a CV-QKD system where Eve may launch an attack by manipulating both quantum signals and oscillators, e.g., time-shift attack.

Various aspects of the present disclosure may be embodied as a program, software, or computer instructions embodied or stored in a computer or machine usable or readable medium, or a group of media which causes the computer or machine to perform the steps of the method when executed on the computer, processor, and/or machine. A program storage device readable by a machine, e.g., a computer readable medium, tangibly embodying a program of instructions executable by the machine to perform various functionalities and methods described in the present disclosure is also provided, e.g., a computer program product.

The computer readable medium could be a computer readable storage device or a computer readable signal medium. A computer readable storage device may be, for example, a magnetic, optical, electronic, electromagnetic, infrared, or semiconductor system, apparatus, or device, or any suitable combination of the foregoing; however, the computer readable storage device is not limited to these examples except a computer readable storage device excludes computer readable signal medium. Additional examples of the computer readable storage device can include: a portable computer diskette, a hard disk, a magnetic storage device, a portable compact disc read-only memory (CD-ROM), a random access memory (RAM), a read-only memory (ROM), an erasable programmable read-only memory (EPROM or Flash memory), an optical storage device, or any appropriate combination of the foregoing; however, the computer readable storage device is also not limited to these examples. Any tangible medium that can contain, or store, a program for use by or in connection with an instruction execution system, apparatus, or device could be a computer readable storage device.

A computer readable signal medium may include a propagated data signal with computer readable program code embodied therein, such as, but not limited to, in baseband or as part of a carrier wave. A propagated signal may take any of a plurality of forms, including, but not limited to, electromagnetic, optical, or any suitable combination thereof. A computer readable signal medium may be any computer readable medium (exclusive of computer readable storage device) that can communicate, propagate, or transport a program for use by or in connection with a system, apparatus, or device. Program code embodied on a computer readable signal medium may be transmitted using any appropriate medium, including but not limited to wireless, wired, optical fiber cable, RF, etc., or any suitable combination of the foregoing.

The processor(s) described herein, e.g., a hardware processor, may be a central processing unit (CPU), a graphics processing unit (GPU), a field programmable gate array (FPGA), an application specific integrated circuit (ASIC), another suitable processing component or device, or one or more combinations thereof. The storage(s) may include random access memory (RAM), read-only memory (ROM) or another memory device, and may store data and/or processor instructions for implementing various functionalities associated with the methods and/or systems described herein.

In the description and claims herein, the term "about" indicates that the value listed may be somewhat altered, as long as the alteration does not result in nonconformance of the process or device. For example, for some elements the term "about" can refer to a variation of ±0.1%, for other elements, the term "about" can refer to a variation of ±1% or ±10%, or any point therein. For example, the term about when used for a measurement in mm, may include+/0.1, 0.2, 0.3, etc., where the difference between the stated number may be larger when the state number is larger. For example, about 1.5 may include 1.2-1.8, where about 20, may include 19.0-21.0.

The terminology used herein is for the purpose of describing particular aspects only and is not intended to be limiting the scope of the disclosure and is not intended to be exhaustive. Many modifications and variations will be apparent to those of ordinary skill in the art without departing from the scope and spirit of the disclosure.

What is claimed is:

1. A system comprising:
a transmitter (TX) device comprising:
   a photon source configured to emit a sequence of photons having a source rate,
   a TX controller configured to generate a key signal having a bit rate equal to the source rate,
   an encoder configured to:
     encode, based on a discrete-variable encoding protocol, the key signal on the sequence of photons to form a quantum signal, and
     launch the quantum signal on an insecure quantum channel with a transmission rate equal to the source rate; and
a receiver (RX) device comprising:
   a modulator communicatively coupled with the encoder through the insecure quantum channel and configured to:
     receive the quantum signal, and
     randomly modulate the received quantum signal to obtain a modulated quantum signal having the transmission rate,
   a first polarization-beam splitter (PBS) configured to project the modulated quantum signal in either a first polarization or a second polarization orthogonal to the first polarization,
   a first conjugate homodyne detector configured to:
     receive the modulated quantum signal projected in the first polarization, and
     simultaneously measure conjugate quadratures X, P of the modulated quantum signal projected in the first polarization,
   a second conjugate homodyne detector configured to:
     receive the modulated quantum signal projected in the second polarization, and
     simultaneously measure conjugate quadratures X, P of the modulated quantum signal projected in the second polarization,
   a decoder configured to determine, based at least in part on the measured conjugate quadratures X, P, a raw-key signal corresponding to the key signal, and a distribution of photon numbers corresponding to the received quantum signal, and
   an RX controller configured to:
     exchange, with the TX controller over a classical communication channel, information about the key signal,
     obtain a gain Q based on the determined raw-key signal and obtain a quantum bit error rate E based on the determined raw-key signal and the exchanged information, and
     calculate a secure-key rate R based at least in part on the obtained gain Q and quantum bit error rate E, and the determined photon number distribution.

2. The system of claim 1, wherein the RX device comprises
a laser configured to emit light as a local oscillator for the first conjugate homodyne detector and the second conjugate homodyne detector,
a second PBS configured to redirect
   a first portion of the local oscillator in the first polarization to the first conjugate homodyne detector, and
   a second portion of the local oscillator in the second polarization to the second conjugate homodyne detector.

3. The system of claim 2, wherein the laser has a pulse repetition rate that matches the source rate.

4. The system of claim 1, wherein the decoder is configured to determine the raw-key signal using a detection mode selected from a plurality of detection modes.

5. The signal of claim 4, wherein the selected detection mode is an independent detection mode and the decoder is configured to determine the raw-key signal using outputs of the first conjugate homodyne detector and the second conjugate homodyne detector independently by comparing the outputs with a predetermined detection threshold $\tau$ associated with the first and second conjugate homodyne detectors, and
the RX controller is configured to calculate the secure-key rate R based further on the predetermined detection threshold $\tau$.

6. The system of claim 5, wherein the predetermined detection threshold $\tau$ is in a range of 1 to 10.

7. The system of claim 5, wherein a contribution Ed to the quantum bit error rate E, which is due to polarization misalignment, is in a range of 0 to 0.05.

8. The system of claim 4, wherein the selected detection mode is a differential detection mode, and
the decoder is configured to determine the raw-key signal using outputs of the first conjugate homodyne detector and the second conjugate homodyne detector jointly by comparing the outputs with each other, and
the RX controller is configured to calculate the secure-key rate R based on the obtained gain Q and quantum bit error rate E, and the determined photon number distribution without a determined detection threshold $\tau$.

9. The system of claim 8, wherein a contribution Ed to the quantum bit error rate E, which is due to polarization misalignment, is in a range of 0 to 0.01.

10. The system of claim 1, wherein the insecure quantum channel comprises an optical fiber having a length less than about 10 km.

11. The system of claim 1, wherein the insecure quantum channel comprises a free-space channel.

12. The system of claim 1, wherein each of the first and second conjugate homodyne detectors comprise shot-noise limited balanced photodiodes with a bandwidth of 5 GHz.

13. The system of claim 12, wherein the shot-noise limited balanced photodiodes are configured to be operated at room temperature.

14. The system of claim 1, wherein the transmission rate is in a range of 1 MHz to 10 GHz.

15. The system of claim 1, wherein to a secure key K is produced by exchanging information between the TX controller and the RX controller.

16. The system of claim 15, wherein the RX controller and the TX controller are configured to produce a plurality of secure keys from respective key signals and raw key signals for a communication session over the classical communication channel.

17. The system of claim 1, wherein the discrete-variable encoding protocol is a polarization encoding protocol.

18. The system of claim 1, wherein the discrete-variable encoding protocol uses BB84.

19. A receiver comprising:
a modulator communicatively coupled with a transmitter (TX) through an insecure quantum channel and configured to
  receive a quantum signal formed by the TX as a sequence of photons encoded, based on a discrete-variable encoding protocol, with a key signal, and
  randomly modulate the received signal to obtain a modulated quantum signal;
a first polarization-beam splitter (PBS) configured to project the modulated quantum signal in either a first polarization or a second polarization orthogonal to the first polarization;
a first conjugate homodyne detector configured to
  receive the modulated quantum signal projected in the first polarization, and
  simultaneously measure conjugate quadratures X, P of the modulated quantum signal projected in the first polarization;
a second conjugate homodyne detector configured to
  receive the modulated quantum signal projected in the second polarization, and
  simultaneously measure conjugate quadratures X, P of the modulated quantum signal projected in the second polarization;
a decoder configured to determine, based at least in part on the measured conjugate quadratures X, P, a raw-key signal corresponding to the key signal, and a distribution of photon numbers corresponding to the received quantum signal; and
an RX controller configured to
  exchange, with the TX over a classical communication channel, information about the key signal,
  obtain a gain Q based on the determined raw-key signal and obtain a quantum bit error rate E based on the determined raw-key signal and the exchanged information, and
  calculate a secure-key rate R based at least in part on the obtained gain Q and quantum bit error rate E, and the determined photon number distribution.

20. The receiver of claim 19, further comprising:
a laser configured to emit light as a local oscillator,
a second PBS configured to redirect
  a first portion of the local oscillator in the first polarization to the first conjugate homodyne detector, and
  a second portion of the local oscillator in the second polarization to the second conjugate homodyne detector.

21. The receiver of claim 20, wherein the laser has a pulse repetition rate that matches the source rate.

22. The receiver of claim 19, wherein the decoder is configured to determine the raw-key signal using a detection mode selected from a plurality of detection modes.

23. The receiver of claim 22, wherein the selected detection mode is an independent detection mode and the decoder is configured to determine the raw-key signal using outputs of the first conjugate homodyne detector and the second conjugate homodyne detector independently by comparing the outputs with a predetermined detection threshold $\tau$ associated with the first and second conjugate homodyne detectors, and
  the RX controller is configured to calculate the secure-key rate R based further on the predetermined detection threshold $\tau$.

24. The receiver of claim 22, wherein the selected detection mode is an differential detection mode and
  the decoder is configured to determine the raw-key signal using outputs of the first conjugate homodyne detector and the second conjugate homodyne detector jointly by comparing the outputs with each other, and
  the RX controller is configured to calculate the secure-key rate R based on the obtained gain Q and quantum bit error rate E, and the determined photon number distribution without a predetermined detection threshold $\tau$.

25. The receiver of claim 19, wherein each of the first and second conjugate homodyne detectors comprise shot-noise limited balanced photodiodes with a bandwidth of 5 GHz.

26. The receiver of claim 25, wherein the shot-noise limited balanced photodiodes are configured to operate at room temperature.

* * * * *